Patented Nov. 18, 1952

2,618,670

UNITED STATES PATENT OFFICE 2,618,670

PROCESS FOR DERESINATING RUBBER FROM PLANTS

Frederick E. Clark, Salinas, Calif., assignor to the United States of America as represented by the Secretary of Agriculture No Drawing. Application July 18, 1950, Serial No. 174,565

3 Claims. (Cl. 260—818)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to an improved process of purifying natural plant rubbers obtained from guayule.

The term "resin" is used herein in the same sense as commonly used in the industry, i. e., as meaning those constituents of the guayule plant that are obtained when the comminuted shrub or the resinous rubber prepared from such shrub is extracted with acetone, ethyl alcohol, or similar organic solvents well known in the art of preparing deresinated rubber.

In the recovery of rubber from guayule by a known mechanical extraction method, the shrub is defoliated, comminuted, and milled with pebbles in a slurry containing appropriate solids until the rubber is agglomerated into granules called "worms." Upon dilution of the slurry with water, the worms float to the surface and are skimmed off. The worms are further purified by treating with water at 100° C. under 500 lbs. per sq. inch hydrostatic pressure to waterlog cork and other plant material which is removed. The remaining worms are then rinse-milled with pebbles and warm water.

The wet worms, containing approximately 50 percent moisture, are then extracted with a water-miscible resin solvent. The worms are finely divided and may be kept from sticking together during extraction by mechanical action as, for example, stirring or agitation. A superior rubber relatively free from resin and degradation can be prepared by this process, but the method suffers from the disadvantage that fresh solvent must be used to dehydrate the rubber before the deresination proper can begin. Otherwise, water dilutes the resin solvent, cuts down its efficiency, and precipitates resin in the system. In a continuous counter-flow system, fresh resin solvent must be added at a point near the entrance of the rubber for dehydration and at a point near the exit of the rubber for the deresination proper. Approximately twice as much fresh solvent is required to accomplish both dehydration and deresination than to accomplish either alone.

In general according to the present invention, simultaneous dehydration and deresination of the guayule rubber-bearing material, including wet resinous guayule rubber like the wet worms or wet guayule shrub, are effected by mixing the material with a partially water-miscible resin solvent which dissolves water at room temperature in a range of about 1 to 20%, rather than with the usual type resin solvents for extracting the resin. The guayule rubber-bearing material is separated from the mixture and the remaining liquid allowed to stand. An aqueous phase and a solvent phase containing the dissolved resin form, the two phases being readily separated from each other.

The main point of distinction between the use of a completely water-miscible solvent and a partially water-miscible solvent can be explained as follows: When the wet guayule rubber-bearing material is extracted with the completely water-miscible solvent, the water derived from the material dilutes the solvent whereby its capacity to dissolve resin is decreased and if the water concentration rises to too high a level, resin actually dissolved in the solvent will be precipitated. However, when a partially water-miscible solvent is employed these disadvantages are eliminated. The water derived from the raw material mixes with the solvent only to a small extent, not enough to materially decrease the solvency power of the solvent nor to precipitate the resin. Any additional amount of water derived from the raw material will not mix with the solvent but will form a phase entirely apart from the phase consisting of solvent saturated with water and the separate water phase will not interfere with the extraction procedure.

Examples of suitable partially water-miscible resin solvents are methyl ethyl ketone, n-butyl alcohol, sec-butyl alcohol, isobutyl alcohol, n-amyl alcohol, tert.-amyl alcohol, isoamyl alcohol, sec-n-amyl alcohol, methyl amyl alcohol, butyraldehyde, benzyl alcohol, nitromethane, nitroethane, and furfural. Methyl ethyl ketone is preferred for the following reasons:

1. Its water saturated solution is an excellent resin solvent.

2. Its azeotrope boils at 73° C., making solvent recovery easy. The azeotrope has a composition of 11 percent water and 89 percent methyl ethyl ketone. The saturated water solution also contains 11 percent water at room temperature and approximately 14 percent water at 70° C. The azeotropic mixture of methyl ethyl ketone and water is used without further purification for deresination. The excess water in the system derived from material being extracted does not interfere in the extraction. In a batch system the excess water is removed with the first and second washes and separates into a clear layer immediately on standing. In a continuous system the excess water settles in the lowest point of the system and may be drained off from time to time. The excess water is not discarded but is sent to the solvent recovery system as it contains approximately 35 percent of dissolved methyl ethyl ketone.

The extraction may be conveniently carried out at any temperature from room temperature to the boiling point of the solvent.

Comminuted guayule shrub as well as the wet worms can be deresinated by the solvent extraction process of the present invention, following which the shrub is processed into rubber. It is important that the shrub be moist (about 20 to 50 percent moisture) before the extraction. Otherwise, poor yields and degraded rubber are obtained. The same advantages apply in this case as in the case of worm deresination.

The resin-containing extract obtained in accordance with this invention may be subjected to distillation to separate the resin from the solvent, the solvent being returned for extracting fresh batches of the worms or shrub. If the solvent forms an azeotrope, then the solvent is returned in this form, i. e., containing dissolved water to be used as fresh extracting liquor. If an azeotrope is not formed then the solvent returned for further extraction will be essentially free from water.

In carrying out the extraction and solvent recovery steps it is advisable to supply some means for separating excess water from the system. This can be done in various ways. For example, the extraction unit can be built with a sump in which the water will collect and can be removed from time to time. In a batch extraction, all the liquor separated from the worms or shrub may be placed in a tank and allowed to stand for a short time whereupon the water phase will settle to the bottom and can be withdrawn by means of a syphon or other suitable mechanism. In any case the water separated will contain more or less solvent depending on the solubility of the solvent in water. Therefore it is advisable to subject the separated water to distillation to recover the solvent therefrom.

The following examples demonstrate the invention in greater detail.

*Example 1*

1000 grams of wet guayule worms (523 g. dry weight) were placed in a 5-liter round bottom flask fitted with a stirrer, reflux condenser, syphon take-off, thermometer, and heating mantle. The worms analyzed on a dry weight basis 76.3 percent rubber hydrocarbon, 5.4 percent acetone-benzene insolubles, and 18.3 percent resin. 14 liters of methyl ethyl ketone azeotrope were introduced continuously through the condenser at the rate of 2 liters every 20 minutes with stirring. The temperature was kept at 70° C. The extract was removed through the syphon take-off at the same rate as the azeotrope was added and divided into 2-liter fractions. Practically all of the excess water settled to the bottom of the first two fractions. The extracted rubber was removed from the flask and air dried. 477 grams of rubber were obtained which analyzed 93.1 percent rubber hydrocarbon, 5.9 percent acetone-benzene insolubles, and 1.0 percent resin. The rubber had a Mooney viscosity at 100° C. of 74. When compounded on the formula shown the rubber had the physical properties indicated.

| Formula: | Parts by weight |
|---|---|
| Rubber | 100.0 |
| Stearic acid | 4.0 |
| Zinc oxide | 6.0 |
| Mercaptobenzothiazole | 1.0 |
| Sulfur | 2.5 |
| Diorthotolylguanidine | 0.08 |

Physical properties at optimum cure:
Optimum cure at 287° F. ____minutes__ 25
Tensile strength _____p. s. i__ 3750
Stress at 500 percent elongation
p.s.i__ 600
Ultimate elongation _____percent__ 780
Hardness _____ shore__ 39

*Example 2*

1000 grams of wet guayule worms (554 g. dry weight) from the same lot as in Example 1 were placed in the same apparatus as in Example 1. Methyl ethyl ketone extracts from previous extractions were added at the rate of 2 liters every 20 minutes. The extracts had previously been segregated into 2-liter fractions of different concentrations and were added in the order of decreasing resin concentration. The first fraction contained 150 grams of resin per liter of solution and each succeeding fraction contained approximately one-half as much resin as the preceding fraction. 26 liters of extract were added in all. This was followed by 2 liters of fresh methyl ethyl ketone azeotrope. The entire extraction was kept at 70° C. After drying, the deresinated rubber weighed 449 g. and analyzed 91.5 percent rubber hydrocarbon, 6.6 percent acetone-benzene insolubles, and 1.9 percent resin. The rubber had a Mooney viscosity at 100° C. of 86.

*Example 3*

2878 grams of wet lush comminuted 2-year-old guayule shrub (1500 g. dry weight) were placed in a kettle fitted with stirrer and drain. The shrub analyzed on a dry weight basis 7.0 percent rubber hydrocarbon and 5.1 percent resin. The shrub was covered with 8 liters of methyl ethyl ketone azeotrope and stirred for 30 minutes at room temperature. The extract was drained off and the excess water in the system collected in a clear layer at the bottom of the extract. 4 liters of methyl ethyl ketone azeotrope were added and stirring was continued for 15 minutes. After draining, the last step was repeated. After draining, the shrub was washed with 10 liters of warm water. The extracted shrub was then processed in the usual manner. 98 grams of dry rubber were obtained which analyzed 92.8 percent rubber hydrocarbon, 4.9 percent acetone-benzene insolubles, and 2.3 percent resin. The rubber had a Mooney viscosity at 100° C. of 93.

Having thus described my invention, I claim:

1. A process for simultaneously dehydrating and deresinating a guayule rubber-bearing material which comprises mixing such a material selected from the group consisting of water-wet guayule shrub and water-wet resinous guayule rubber with methyl ethyl ketone-water azeotrope containing about 11% water, about 89% methyl ethyl ketone and boiling at about 73° C., seperating the guayule rubber-bearing material from the mixture, allowing the remaining liquid to stand forming an aqueous phase and a methyl ethyl ketone phase containing dissolved resin, and separating the phases from each other.

2. The process in accordance with claim 1 wherein the methyl ethyl ketone phase containing dissolved resin is subjected to distillation and the distilled methyl ethyl ketone-water azeotrope is used to extract another batch of guayule material.

3. A continuous process for simultaneously dehydrating and deresinating a guayule rubber-bearing material which comprises continuously passing such a material selected from the group consisting of water-wet guayule shrub and water-wet resinous guayule rubber through an extraction zone where it is contacted with a stream of methyl ethyl ketone-water azeotrope containing about 11% water, about 89% methyl ethyl ketone and boiling at about 73° C., removing the water which is displaced from the guayule material by the azeotropic solvent and which collects at a low point in the extraction zone, continuously removing the azeotropic solvent extract containing dissolved resin from the extraction zone, continuously distilling this extract and continuously returning the distilled methyl ethyl ketone-water azeotrope to the extraction zone to extract added increments of guayule material.

FREDERICK E. CLARK.

REFERENCES CITED

The following references are of record in the file of this patent:

UNITED STATES PATENTS

| Number | Name | Date |
|---|---|---|
| 814,407 | Von Stechow | Mar. 6, 1906 |
| 890,217 | Chute | June 9, 1908 |
| 2,390,860 | Williams | Dec. 11, 1945 |
| 2,434,412 | Jones | Jan. 13, 1948 |
| 2,459,369 | Tint et al. | Jan. 18, 1949 |

OTHER REFERENCES

India Rubber World, vol. 108 of 1945, pages 37–39.